United States Patent
Ahuja et al.

(10) Patent No.: US 7,814,327 B2
(45) Date of Patent: Oct. 12, 2010

(54) DOCUMENT REGISTRATION

(75) Inventors: Ratinder Paul Singh Ahuja, Saratoga, CA (US); Matthew Howard, Saratoga, CA (US); Rick Lowe, Menlo Park, CA (US); Erik de la Iglesia, Mountain View, CA (US); William Deninger, Mountain View, CA (US)

(73) Assignee: McAfee, Inc., Santa Clara, CA (US)

( * ) Notice: Subject to any disclaimer, the term of this patent is extended or adjusted under 35 U.S.C. 154(b) by 976 days.

(21) Appl. No.: 10/815,239

(22) Filed: Mar. 30, 2004

(65) Prior Publication Data

US 2005/0127171 A1    Jun. 16, 2005

Related U.S. Application Data

(60) Provisional application No. 60/528,631, filed on Dec. 10, 2003.

(51) Int. Cl.
H04L 29/06 (2006.01)
H04L 9/32 (2006.01)
G06F 21/00 (2006.01)
G06F 15/173 (2006.01)
G06F 15/16 (2006.01)

(52) U.S. Cl. .......... 713/177; 713/162; 713/179; 713/182; 713/168; 709/224; 709/249

(58) Field of Classification Search .......... 709/224, 709/249; 713/182, 162, 151; 726/3, 11, 726/13

See application file for complete search history.

(56) References Cited

U.S. PATENT DOCUMENTS

| | | | |
|---|---|---|---|
| 4,286,255 A | 8/1981 | Siy | |
| 4,710,957 A | 12/1987 | Bocci et al. | |
| 5,465,299 A | 11/1995 | Matsumoto et al. | |
| 5,557,747 A | 9/1996 | Rogers et al. | |
| 5,768,578 A | 6/1998 | Kirk | |
| 5,781,629 A | 7/1998 | Haber et al. | |
| 5,794,052 A | 8/1998 | Harding | |
| 5,943,670 A | 8/1999 | Prager | |
| 5,995,111 A | 11/1999 | Morioka et al. | |
| 6,078,953 A | 6/2000 | Vaid et al. | |

(Continued)

OTHER PUBLICATIONS

"Computer program product for analyzing network traffic", Ethereal. Computer program product for analyzing network traffic, pp. 17-26. http://web.archive.org/web/20030315045117/www.ethereal.com/distribution/docs/user-guide.

(Continued)

*Primary Examiner*—Shin-Hon Chen
(74) *Attorney, Agent, or Firm*—Patent Capital Group

(57) ABSTRACT

A document accessible over a network can be registered. A registered document, and the content contained therein, cannot be transmitted undetected over and off of the network. In one embodiment, the invention includes maintaining a plurality of stored signatures, each signature being associated with one of a plurality of registered documents, intercepting an object being transmitted over a network, calculating a set of signatures associated with the intercepted object, and comparing the set of signatures with the plurality of stored signatures. In one embodiment, the invention can further include detecting registered content from the registered document being contained in the intercepted object, if the comparison results in a match of at least one of the signatures in the set of signatures with one or more of the plurality of stored signatures.

19 Claims, 8 Drawing Sheets

U.S. PATENT DOCUMENTS

| | | |
|---|---|---|
| 6,094,531 A | 7/2000 | Allison et al. |
| 6,108,697 A | 8/2000 | Raymond et al. |
| 6,192,472 B1 | 2/2001 | Garay et al. |
| 6,243,091 B1 | 6/2001 | Berstis |
| 6,292,810 B1 | 9/2001 | Richards |
| 6,356,885 B2 | 3/2002 | Ross et al. |
| 6,408,294 B1 | 6/2002 | Getchius et al. |
| 6,493,761 B1 | 12/2002 | Baker et al. |
| 6,499,105 B1 | 12/2002 | Yoshiura et al. |
| 6,515,681 B1 | 2/2003 | Knight |
| 6,523,026 B1 | 2/2003 | Gillis |
| 6,539,024 B1 | 3/2003 | Janoska et al. |
| 6,571,275 B1 | 5/2003 | Dong et al. |
| 6,598,033 B2 | 7/2003 | Ross et al. |
| 6,662,176 B2 | 12/2003 | Brunet et al. |
| 6,691,209 B1 | 2/2004 | O'Connell |
| 6,771,595 B1 | 8/2004 | Gilbert et al. |
| 6,772,214 B1 | 8/2004 | McClain et al. |
| 6,785,815 B1 | 8/2004 | Serret-Avila et al. |
| 6,820,082 B1 | 11/2004 | Cook et al. |
| 6,857,011 B2 | 2/2005 | Reinke |
| 6,937,257 B1 | 8/2005 | Dunlavey |
| 6,950,864 B1 | 9/2005 | Tsuchiya |
| 6,978,297 B1 | 12/2005 | Piersol |
| 7,020,654 B1 | 3/2006 | Najmi |
| 7,020,661 B1 | 3/2006 | Cruanes et al. |
| 7,062,572 B1 | 6/2006 | Hampton |
| 7,072,967 B1 | 7/2006 | Saulpaugh et al. |
| 7,082,443 B1 | 7/2006 | Ashby |
| 7,093,288 B1 * | 8/2006 | Hydrie et al. ............... 726/13 |
| 7,130,587 B2 | 10/2006 | Hikokubo et al. |
| 7,158,983 B2 | 1/2007 | Willse et al. |
| 7,185,073 B1 | 2/2007 | Gai et al. |
| 7,185,192 B1 | 2/2007 | Kahn |
| 7,219,131 B2 | 5/2007 | Banister et al. |
| 7,219,134 B2 | 5/2007 | Takeshima et al. |
| 7,243,120 B2 | 7/2007 | Massey |
| 7,246,236 B2 | 7/2007 | Stirbu |
| 7,254,562 B2 | 8/2007 | Hsu et al. |
| 7,266,845 B2 | 9/2007 | Hypponen |
| 7,277,957 B2 | 10/2007 | Rowley et al. |
| 7,290,048 B1 | 10/2007 | Barnett et al. |
| 7,296,070 B2 | 11/2007 | Sweeney et al. |
| 7,296,088 B1 | 11/2007 | Padmanabhan et al. |
| 7,299,277 B1 | 11/2007 | Moran et al. |
| 7,373,500 B2 | 5/2008 | Ramelson et al. |
| 7,424,744 B1 | 9/2008 | Wu et al. |
| 7,426,181 B1 | 9/2008 | Feroz et al. |
| 7,434,058 B2 | 10/2008 | Ahuja et al. |
| 7,477,780 B2 | 1/2009 | Boncyk et al. |
| 7,483,916 B2 | 1/2009 | Lowe et al. |
| 7,493,659 B1 | 2/2009 | Wu et al. |
| 7,506,055 B2 | 3/2009 | McClain et al. |
| 7,509,677 B2 | 3/2009 | Saurabh et al. |
| 7,516,492 B1 | 4/2009 | Nisbet et al. |
| 7,596,571 B2 | 9/2009 | Sifry |
| 7,664,083 B1 | 2/2010 | Cermak et al. |
| 2001/0037324 A1 | 11/2001 | Agrawal et al. |
| 2002/0032677 A1 | 3/2002 | Morgenthaler et al. |
| 2002/0052896 A1 | 5/2002 | Streit et al. |
| 2002/0078355 A1 | 6/2002 | Samar |
| 2002/0091579 A1 | 7/2002 | Yehia et al. |
| 2002/0103876 A1 | 8/2002 | Chatani et al. |
| 2002/0107843 A1 | 8/2002 | Biebesheimer et al. |
| 2002/0116124 A1 | 8/2002 | Garin et al. |
| 2002/0126673 A1 | 9/2002 | Dagli et al. |
| 2002/0129140 A1 * | 9/2002 | Peled et al. ............... 709/224 |
| 2002/0159447 A1 | 10/2002 | Carey et al. |
| 2003/0009718 A1 | 1/2003 | Wolfgang et al. |
| 2003/0028493 A1 * | 2/2003 | Tajima et al. ............... 705/67 |
| 2003/0028774 A1 | 2/2003 | Meka |
| 2003/0046369 A1 | 3/2003 | Sim et al. |
| 2003/0053420 A1 | 3/2003 | Duckett et al. |
| 2003/0065571 A1 | 4/2003 | Dutta |
| 2003/0084300 A1 * | 5/2003 | Koike ............... 713/182 |
| 2003/0084318 A1 | 5/2003 | Schertz |
| 2003/0084326 A1 * | 5/2003 | Tarquini ............... 713/200 |
| 2003/0093678 A1 | 5/2003 | Bowe et al. |
| 2003/0099243 A1 | 5/2003 | Oh et al. |
| 2003/0105739 A1 | 6/2003 | Essafi et al. |
| 2003/0131116 A1 | 7/2003 | Jain et al. |
| 2003/0135612 A1 | 7/2003 | Huntington |
| 2003/0185220 A1 | 10/2003 | Valenci |
| 2003/0196081 A1 | 10/2003 | Savarda et al. |
| 2003/0204741 A1 | 10/2003 | Schoen et al. |
| 2003/0221101 A1 | 11/2003 | Micali |
| 2003/0225796 A1 | 12/2003 | Matsubara |
| 2003/0225841 A1 | 12/2003 | Song et al. |
| 2003/0231632 A1 | 12/2003 | Haeberlen |
| 2004/0001498 A1 * | 1/2004 | Chen et al. ............... 370/401 |
| 2004/0059736 A1 | 3/2004 | Willse et al. |
| 2004/0071164 A1 | 4/2004 | Baum |
| 2004/0111678 A1 | 6/2004 | Hara |
| 2004/0114518 A1 | 6/2004 | MacFaden et al. |
| 2004/0117414 A1 | 6/2004 | Braun et al. |
| 2004/0120325 A1 | 6/2004 | Ayres |
| 2004/0122863 A1 | 6/2004 | Sidman |
| 2004/0181513 A1 | 9/2004 | Henderson et al. |
| 2004/0194141 A1 | 9/2004 | Sanders |
| 2004/0196970 A1 | 10/2004 | Cole |
| 2004/0230572 A1 | 11/2004 | Omoigui |
| 2004/0267753 A1 | 12/2004 | Hoche |
| 2005/0004911 A1 | 1/2005 | Goldberg et al. |
| 2005/0021715 A1 | 1/2005 | Dugatkin et al. |
| 2005/0021743 A1 | 1/2005 | Fleig et al. |
| 2005/0022114 A1 | 1/2005 | Shanahan et al. |
| 2005/0027881 A1 | 2/2005 | Figueira et al. |
| 2005/0033747 A1 | 2/2005 | Wittkotter |
| 2005/0033803 A1 | 2/2005 | Vleet et al. |
| 2005/0038809 A1 | 2/2005 | Abajian et al. |
| 2005/0050205 A1 | 3/2005 | Gordy et al. |
| 2005/0055327 A1 | 3/2005 | Agrawal et al. |
| 2005/0055399 A1 | 3/2005 | Savchuk |
| 2005/0091443 A1 | 4/2005 | Hershkovich et al. |
| 2005/0091532 A1 | 4/2005 | Moghe |
| 2005/0108244 A1 | 5/2005 | Riise et al. |
| 2005/0114452 A1 | 5/2005 | Prakash |
| 2005/0120006 A1 | 6/2005 | Nye |
| 2005/0128242 A1 | 6/2005 | Suzuki |
| 2005/0131876 A1 | 6/2005 | Ahuja et al. |
| 2005/0132034 A1 | 6/2005 | de la Iglesia et al. |
| 2005/0132046 A1 | 6/2005 | de la Iglesia et al. |
| 2005/0132079 A1 | 6/2005 | de la Iglesia et al. |
| 2005/0132197 A1 | 6/2005 | Medlar |
| 2005/0132198 A1 | 6/2005 | Ahuja et al. |
| 2005/0132297 A1 | 6/2005 | Milic-Frayling et al. |
| 2005/0138242 A1 | 6/2005 | Pope et al. |
| 2005/0138279 A1 | 6/2005 | Somasundaram |
| 2005/0149504 A1 | 7/2005 | Ratnaparkhi |
| 2005/0166066 A1 | 7/2005 | Ahuja et al. |
| 2005/0177725 A1 | 8/2005 | Lowe et al. |
| 2005/0180341 A1 | 8/2005 | Nelson et al. |
| 2005/0203940 A1 | 9/2005 | Farrar et al. |
| 2005/0204129 A1 | 9/2005 | Sudia et al. |
| 2005/0228864 A1 | 10/2005 | Robertson |
| 2005/0235153 A1 | 10/2005 | Ikeda |
| 2005/0289181 A1 | 12/2005 | Deninger et al. |
| 2006/0005247 A1 | 1/2006 | Zhang et al. |
| 2006/0021045 A1 | 1/2006 | Cook |
| 2006/0021050 A1 | 1/2006 | Cook et al. |
| 2006/0037072 A1 | 2/2006 | Rao et al. |
| 2006/0041560 A1 | 2/2006 | Forman et al. |
| 2006/0041570 A1 | 2/2006 | Lowe et al. |
| 2006/0041760 A1 | 2/2006 | Huang |

| | | |
|---|---|---|
| 2006/0047675 A1 | 3/2006 | Lowe et al. |
| 2006/0083180 A1 | 4/2006 | Baba et al. |
| 2006/0167896 A1 | 7/2006 | Kapur et al. |
| 2006/0184532 A1 | 8/2006 | Hamada et al. |
| 2006/0242126 A1 | 10/2006 | Fitzhugh |
| 2006/0242313 A1 | 10/2006 | Le et al. |
| 2006/0251109 A1 | 11/2006 | Muller et al. |
| 2006/0288216 A1 | 12/2006 | Buhler et al. |
| 2007/0006293 A1 | 1/2007 | Balakrishnan et al. |
| 2007/0036156 A1 | 2/2007 | Liu et al. |
| 2007/0050334 A1 | 3/2007 | Deninger et al. |
| 2007/0050381 A1 | 3/2007 | Hu et al. |
| 2007/0094394 A1 | 4/2007 | Singh et al. |
| 2007/0110089 A1 | 5/2007 | Essafi et al. |
| 2007/0116366 A1 | 5/2007 | Deninger et al. |
| 2007/0136599 A1 | 6/2007 | Suga |
| 2007/0162609 A1 | 7/2007 | Pope et al. |
| 2007/0226504 A1 | 9/2007 | de la Iglesia et al. |
| 2007/0226510 A1 | 9/2007 | de la Iglesia et al. |
| 2007/0248029 A1 | 10/2007 | Merkey et al. |
| 2007/0271254 A1 | 11/2007 | de la Iglesia et al. |
| 2007/0271371 A1 | 11/2007 | Singh et al. |
| 2007/0271372 A1 | 11/2007 | Deninger et al. |
| 2007/0280123 A1 | 12/2007 | Atkins et al. |
| 2008/0028467 A1 | 1/2008 | Kommareddy et al. |

OTHER PUBLICATIONS

Office Action from U.S. Appl. No. 11/388,734, mailed Feb. 5, 2008, 12 pgs.
U.S. Appl. No. 12/190,536, filed Aug. 12, 2008, entitled "Configuration Management for a Capture/Registration System," Inventor(s) Jitendra B. Gaitonde et al.
U.S. Appl. No. 12/352,720, filed Jan. 13, 2009, entitled "System and Method for Concept Building," Inventor(s) Ratinder Paul Singh Ahuja et al.
U.S. Appl. No. 12/354,688, filed Jan. 15, 2009, entitled "System and Method for Intelligent Term Grouping," Inventor(s) Ratinder Paul Ahuja et al.
U.S. Appl. No. 12/358,399, filed Jan. 23, 2009, entitled "System and Method for Intelligent State Management," Inventor(s) William Deninger et al.
U.S. Appl. No. 12/410,875, filed Mar. 25, 2009, entitled "System and Method for Data Mining and Security Policy Management," Inventor(s) Ratinder Paul Singh Ahuja et al.
U.S. Appl. No. 12/410,905, filed Mar. 25, 2009, entitled "System and Method for Managing Data and Policies," Inventor(s) Ratinder Paul Singh Ahuja et al.
Preneel, Bart, "Cryptographic Hash Functions", Proceedings of the $3^{rd}$ Symposium on State and Progress of Research in Cryptography, 1993, pp. 161-171.
U.S. Appl. No. 12/360,537, filed Jan. 27, 2009, entitled "Database for a Capture System," Inventor(s) Rick Lowe et al.
U.S. Appl. No. 11/254,436, filed Oct. 19, 2005, entitled "Attributes of Captured Objects in a Capture System," Inventor(s) William Deninger et al.
U.S. Appl. No. 12/472,150, filed May 26, 2009, entitled "Identifying Image Type in a Capture System," Inventor(s) William Deninger et al.
U.S. Appl. No. 11/900,964, filed Sep. 14, 2007, entitled "System and Method for Indexing a Capture System," Inventor(s) Ashok Doddapaneni et al.
U.S. Appl. No. 12/171,232, filed Jul. 10, 2008, entitled "System and Method for Data Mining and Security Policy Management," Inventor(s) Weimin Liu et al.
Microsoft Outlook, Out look, copyright 1995-2000, 2 pages, (1995).
U.S. Appl. No. 12/690,153, filed Jan. 20, 2010, entitled "Query Generation for a Capture System," Inventor(s) Erik de la Iglesia, et al.
U.S. Appl. No. 12/751,876, filed Mar. 31, 2010, entitled "Attributes of Captured Objects in a Capture System," Inventor(s) William Deninger, et al.

* cited by examiner

US 7,814,327 B2

DOCUMENT REGISTRATION

PRIORITY AND RELATED APPLICATIONS

This patent application is related to, incorporates by reference, and claims the priority benefit of U.S. Provisional Application 60/528,631, entitled "DOCUMENT REGISTRATION", filed Dec. 10, 2003.

FIELD OF THE INVENTION

The present invention relates to computer networks, and in particular, to registering documents in a computer network.

BACKGROUND

Computer networks and systems have become indispensable tools for modern business. Modern enterprises use such networks for communications and for storage. The information and data stored on the network of a business enterprise is often a highly valuable asset. Modern enterprises use numerous tools to keep outsiders, intruders, and unauthorized personnel from accessing valuable information stored on the network. These tools include firewalls, intrusion detection systems, and packet sniffer devices. However, once an intruder has gained access to sensitive content, there is no network device that can prevent the electronic transmission of the content from the network to outside the network. Similarly, there is no network device that can analyze the data leaving the network to monitor for policy violations, and make it possible to track down information, leaks. What is needed is a comprehensive system to capture, store, and analyze all data communicated using the enterprises network.

SUMMARY OF THE INVENTION

A document accessible over a network can be registered. A registered document, and the content contained therein, cannot be transmitted undetected over and off of the network. In one embodiment, the invention includes maintaining a plurality of stored signatures, each signature being associated with one of a plurality of registered documents, intercepting an object being transmitted over a network, calculating a set of signatures associated with the intercepted object, and comparing the set of signatures with the plurality of stored signatures. In one embodiment, the invention can further include detecting registered content from the registered document being contained in the intercepted object, if the comparison results in a match of at least one of the signatures in the set of signatures with one or more of the plurality of stored signatures.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Although the present system will be discussed with reference to various illustrated examples, these examples should not be read to limit the broader spirit and scope of the present invention. Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Networks

Figure 1:
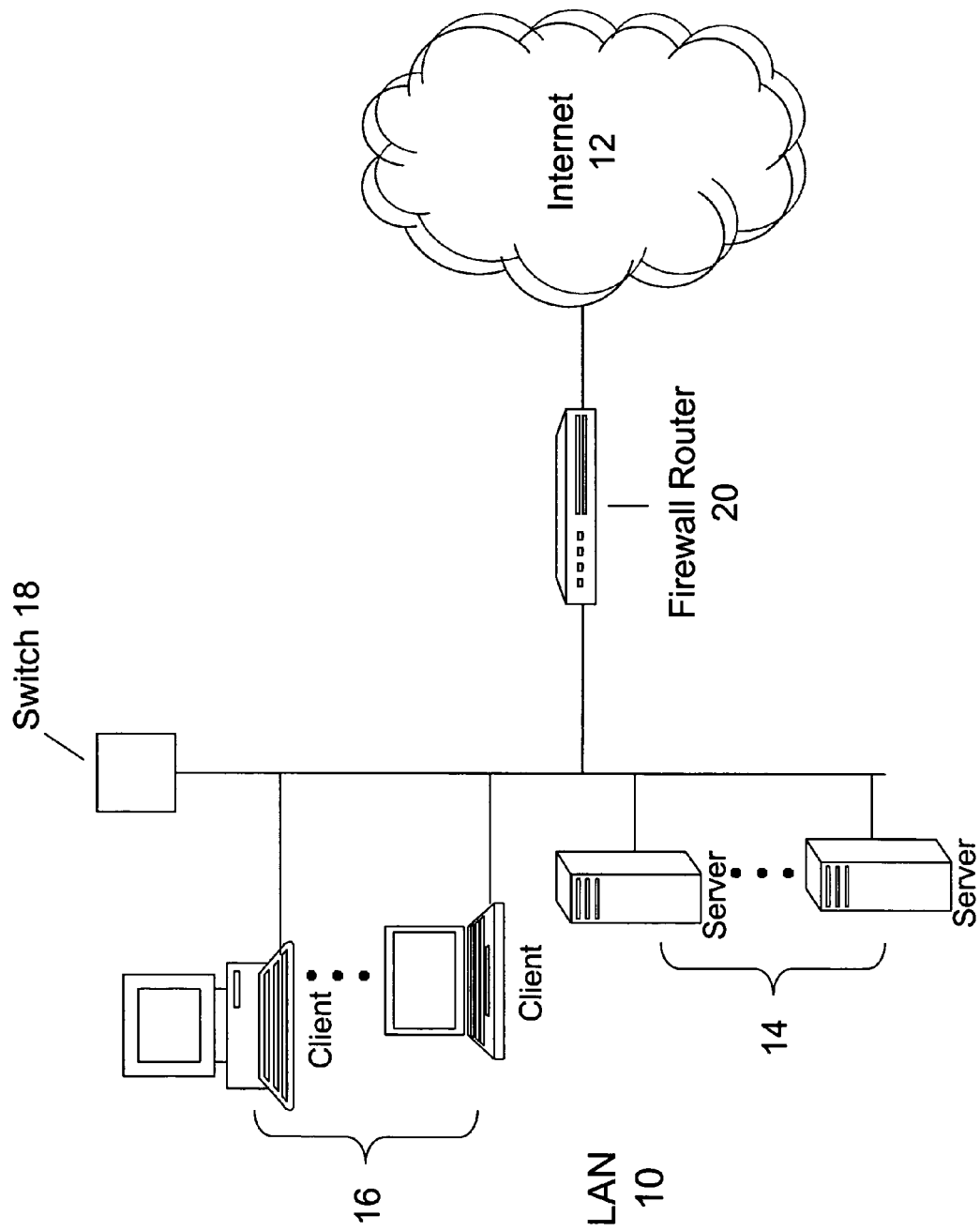
FIG. 1 is a block diagram illustrating a computer network connected to the Internet.

FIG. 1 illustrates a simple prior art configuration of a local area network (LAN) 10 connected to the Internet 12. Connected to the LAN 10 are various components, such as servers 14, clients 16, and switch 18. There are numerous other known networking components and computing devices that can be connected to the LAN 10. The LAN 10 can be implemented using various wireline or wireless technologies, such as Ethernet and 802.11b. The LAN 10 may be much more complex than the simplified diagram in FIG. 1, and may be connected to other LANs as well.

FIG. 1 illustrates a simple prior art configuration of a local area network (LAN) 10 connected to the Internet 12. Connected to the LAN 10 are various components, such as servers 14, clients 16, and switch 18. There are numerous other known networking components and computing devices that can be connected to the LAN 10. The LAN 10 can be implemented using various wireline or wireless technologies, such as Ethernet and 802.11b. The LAN 10 may be much more complex than the simplified diagram in FIG. 1, and may be connected to other LANs as well.

In FIG. 1, the LAN 10 is connected to the Internet 12 via a router 20. This router 20 can be used to implement a firewall, which are widely used to give users of the LAN 10 secure access to the Internet 12 as well as to separate a company's public Web server (can be one of the servers 14) from its internal network, i.e., LAN 10. In one embodiment, any data leaving the LAN 10 towards the Internet 12 must pass through the router 20. However, there the router 20 merely forwards packets to the Internet 12. The router 20 cannot capture, analyze and store, in a searchable manner, the content contained in the forwarded packets.

Figure 2:
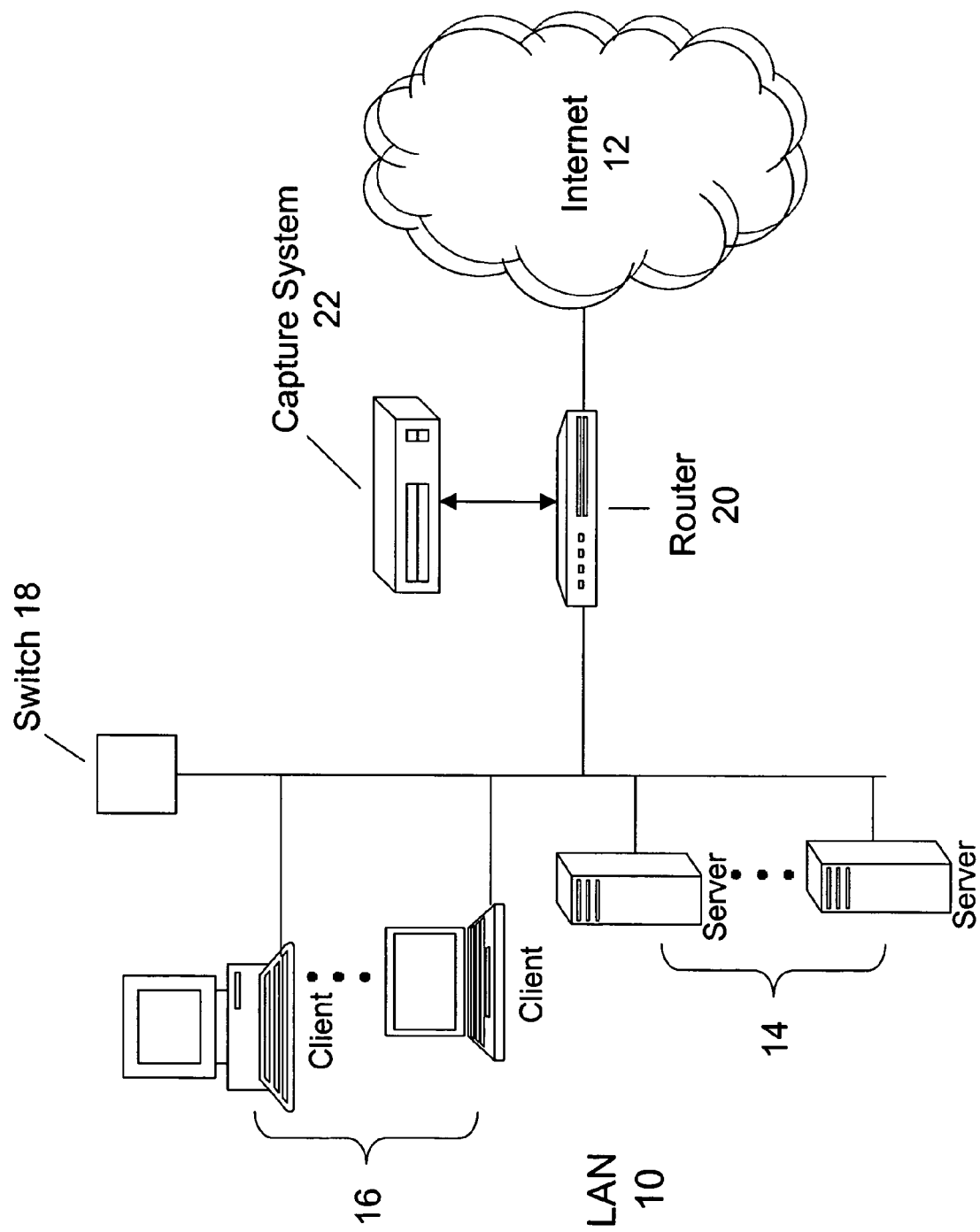
FIG. 2 is a block diagram illustrating one configuration of a capture system according to one embodiment of the present invention.

One embodiment of the present invention is now illustrated with reference to FIG. 2. FIG. 2 shows the same simplified configuration of connecting the LAN 10 to the Internet 12 via the router 20. However, in FIG. 2, the router 20 is also connected to a capture system 22. In one embodiment, the router 20 splits the outgoing data stream, and forwards one copy to the Internet 12 and the other copy to the capture system 22.

There are various other possible configurations. For example, the router 12 can also forward a copy of all incoming data to the capture system 22 as well. Furthermore, the capture system 22 can be configured sequentially in front of, or behind the router 20, however this makes the capture system 22 a critical component in connecting to the Internet 12. In systems where a router 20 is not used at all, the capture system can be interposed directly between the LAN 10 and the Internet 12. In one embodiment, the capture system 22 has a user interface accessible from a LAN-attached device, such as a client 16.

Capture System

Figure 3:
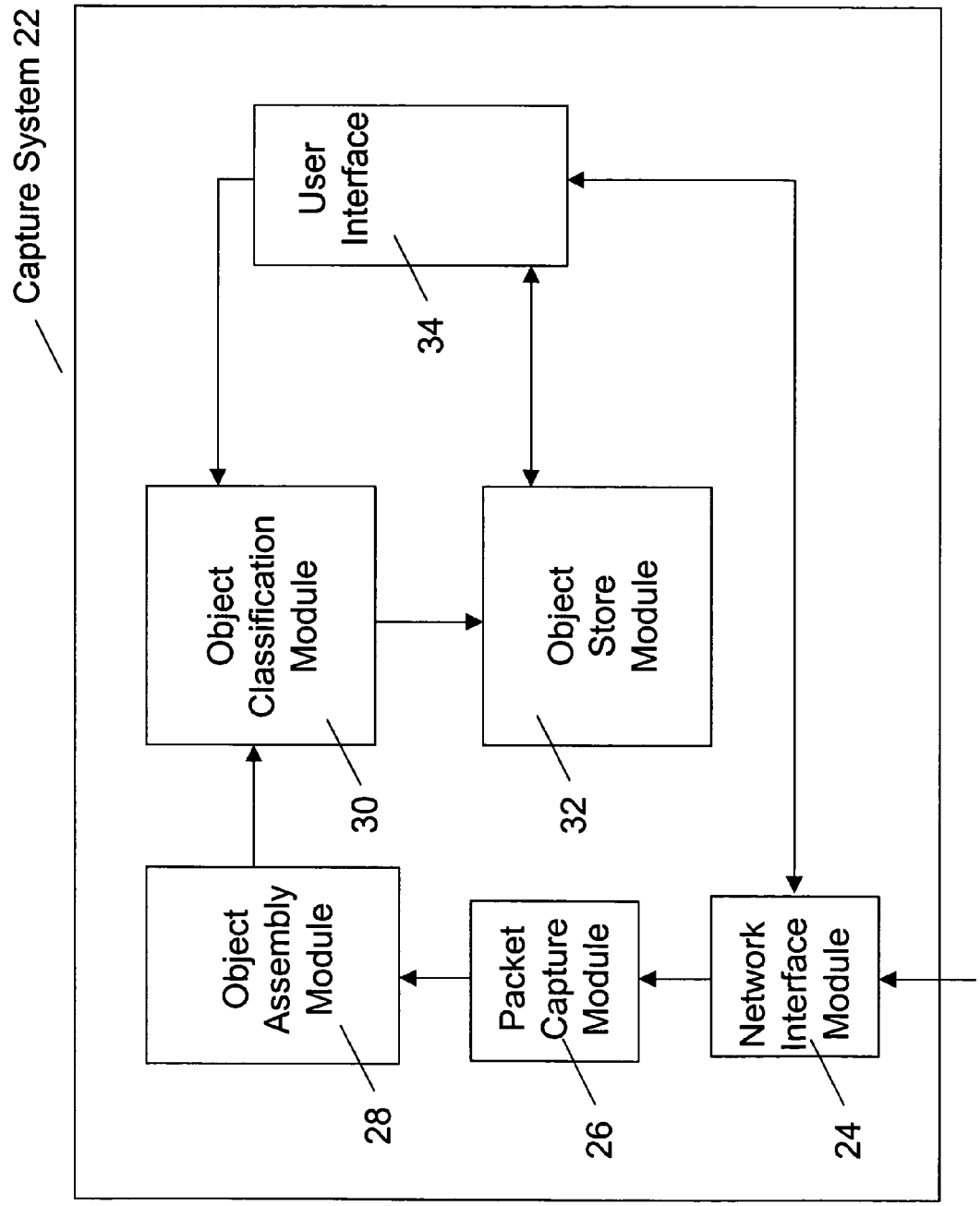
FIG. 3 is a block diagram illustrating the capture system according to one embodiment of the present invention.

One embodiment of the present invention is now described with reference to FIG. 3. FIG. 3 shows one embodiment of the capture system 22 in more detail. The capture system 22 is also sometimes referred to as a content analyzer, content or data analysis system, and other similar names. In one embodiment, the capture system 22 includes a network interface module 24 to receive the data from the network 10 or the router 20. In one embodiment, the network interface module 24 is implemented using one or more network interface cards (NIC), e.g., Ethernet cards. In one embodiment, the router 20 delivers all data leaving the network to the network interface module 24.

The captured raw data is then passed to a packet capture module 26. In one embodiment, the packet capture module 26 extracts data packets from the data stream received from the network interface module 24. In one embodiment, the packet capture module 26 reconstructs Ethernet packets from multiple sources to multiple destinations for the raw data stream.

In one embodiment, the packets are then provided the object assembly module 28. The object assembly module 28 reconstructs the objects being transmitted by the packets. For example, when a document is transmitted, e.g. as an email attachment, it is broken down into packets according to various data transfer protocols such as Transmission Control Protocol/Internet Protocol (TCP/IP) and Ethernet. The object assembly module 28 can reconstruct the document from the captured packets.

Figure 4:
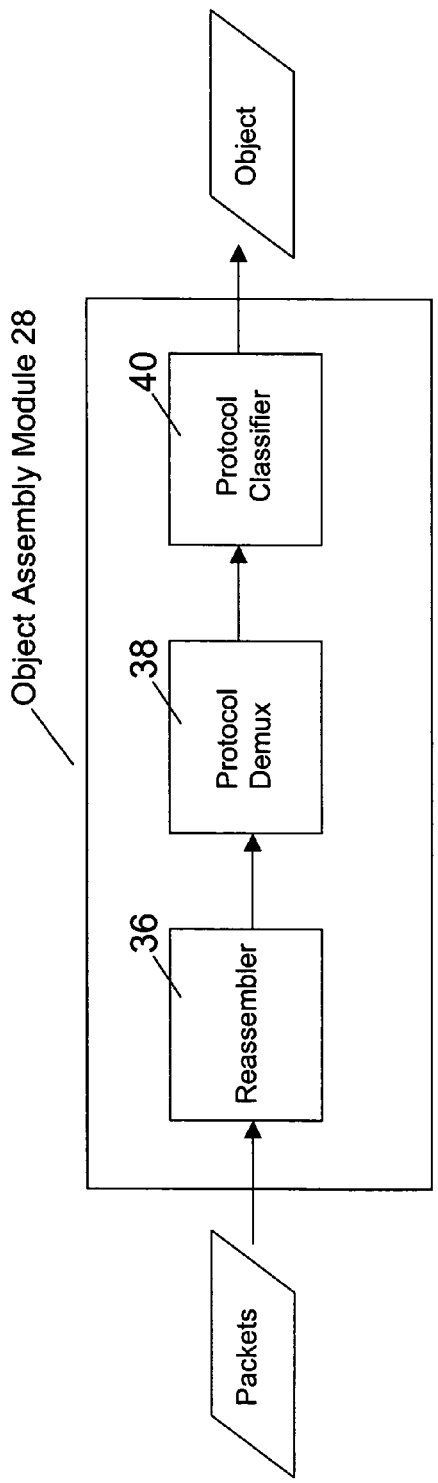
FIG. 4 is a block diagram illustrating an object assembly module according to one embodiment of the present invention.

One embodiment of the object assembly module 28 is now described in more detail with reference to FIG. 4. When packets first enter the object assembly module, they are first provided to a reassembler 36. In one embodiment, the reassembler 36 groups—assembles—the packets into unique flows. For example, a flow can be defined as packets with identical Source IP and Destination IP addresses as well as identical TCP Source and Destination Ports. That is, the reassembler 36 can organize a packet stream by sender and recipient.

In one embodiment, the reassembler 36 begins a new flow upon the observation of a starting packet defined by the data transfer protocol. For a TCP/IP embodiment, the starting packet is generally referred to as the "SYN" packet. The flow can terminate upon observation of a finishing packet, e.g., a "Reset" or "FIN" packet in TCP/IP. If now finishing packet is observed by the reassembler 36 within some time constraint, it can terminate the flow via a timeout mechanism. In an embodiment using the TPC protocol, a TCP flow contains an ordered sequence of packets that can be assembled into a contiguous data stream by the reassembler 36. Thus, in one embodiment, a flow is an ordered data stream of a single communication between a source and a destination.

The flow assembled by the reassembler 36 can then be provided to a protocol demultiplexer (demux) 38. In one embodiment, the protocol demux 38 sorts assembled flows using the TCP Ports. This can include performing a speculative classification of the flow contents based on the association of well-known port numbers with specified protocols. For example, Web Hyper Text Transfer Protocol (HTTP) packets——i.e., Web traffic—are typically associated with port 80, File Transfer Protocol (FTP) packets with port 20, Kerberos authentication packets with port 88, and so on. Thus in one embodiment, the protocol demux 38 separates all the different protocols in one flow.

In one embodiment, a protocol classifier 40 also sorts the flows in addition to the protocol demux 38. In one embodiment, the protocol classifier 40—operating either in parallel or in sequence with the protocol demux 38—applies signature filters to the flows to attempt to identify the protocol based solely on the transported data. Furthermore, the protocol demux 38 can make a classification decision based on port number which is subsequently overridden by protocol classifier 40. For example, if an individual or program attempted to masquerade an illicit communication (such as file sharing) using an apparently benign port such as port 80 (commonly used for HTTP Web browsing), the protocol classifier 40 would use protocol signatures, i.e., the characteristic data sequences of defined protocols, to verify the speculative classification performed by protocol demux 38.

In one embodiment, the object assembly module 28 outputs each flow organized by protocol, which represent the underlying objects. Referring again to FIG. 3, these objects can then be handed over to the object classification module 30 (sometimes also referred to as the "content classifier") for classification based on content. A classified flow may still contain multiple content objects depending on the protocol used. For example, protocols such as HTTP (Internet Web Surfing) may contain over 100 objects of any number of content types in a single flow. To deconstruct the flow, each object contained in the flow is individually extracted, and decoded, if necessary, by the object classification module 30.

The object classification module 30 uses the inherent properties and signatures of various documents to determine the content type of each object. For example, a Word document has a signature that is distinct from a PowerPoint document, or an Email document. The object classification module 30 can extract out each individual object and sort them out by such content types. Such classification renders the present invention immune from cases where a malicious user has altered a file extension or other property in an attempt to avoid detection of illicit activity.

In one embodiment, the object classification module 30 determines whether each object should be stored or discarded. In one embodiment, this determination is based on a various capture rules. For example, a capture rule can indicate that Web Traffic should be discarded. Another capture rule can indicate that all PowerPoint documents should be stored, except for ones originating from the CEO's IP address. Such capture rules can be implemented as regular expressions, or by other similar means.

In one embodiment, the capture rules are authored by users of the capture system 22. The capture system 22 is made accessible to any network-connected machine through the network interface module 24 and user interface 34. In one embodiment, the user interface 34 is a graphical user interface providing the user with friendly access to the various features of the capture system 22. For example, the user interface 34 can provide a capture rule authoring tool that allows users to write and implement any capture rule desired, which are then applied by the object classification module 30 when determining whether each object should be stored. The user interface 34 can also provide pre-configured capture rules that the user can select from along with an explanation of the operation of such standard included capture rules. In one embodiment, the default capture rule implemented by the object classification module 30 captures all objects leaving the network 10.

Figure 5:
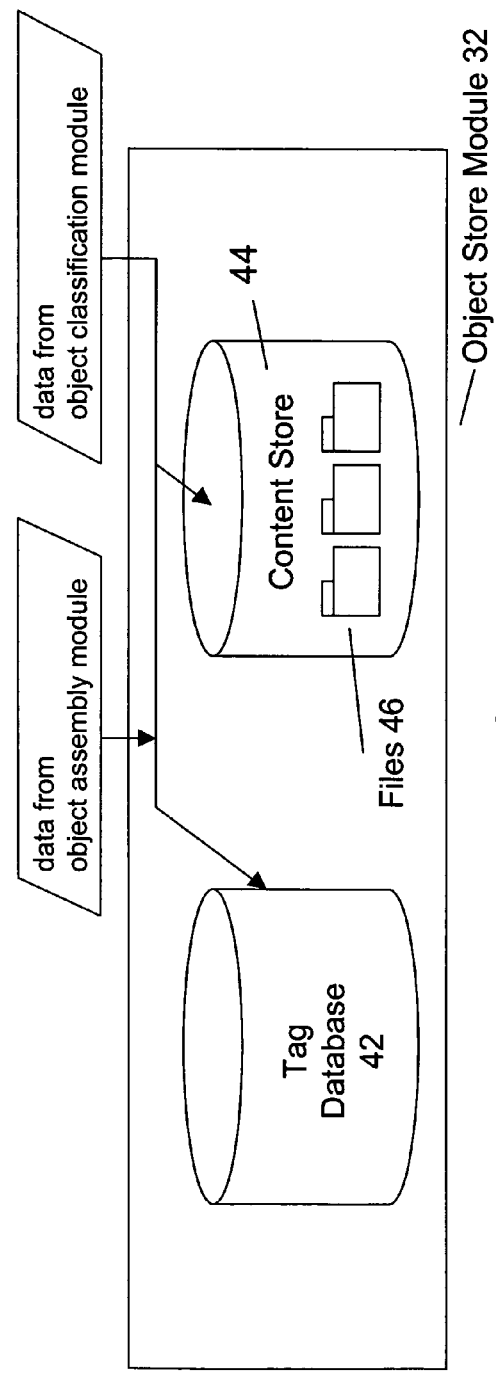
FIG. 5 is a block diagram illustrating an object store module according to one embodiment of the present invention.

If the capture of an object is mandated by the capture rules, the object classification module 30 can also determine where in the object store module 32 the captured object should be stored. With reference to FIG. 5, in one embodiment, the objects are stored in a content store 44 memory block. Within the content store 44 are files 46 divided up by content type. Thus, for example, if the object classification module determines that an object is a Word document that should be stored, it can store it in the file 46 reserved for Word documents. In one embodiment, the object store module 32 is integrally included in the capture system 22. In other embodiments, the object store module can be external—entirely or in part—using, for example, some network storage technique such as network attached storage (NAS) and storage area network (SAN).

In one embodiment, the content store is a canonical storage location, simply a place to deposit the captured objects. The indexing of the objects stored in the content store 44 is accomplished using a tag database 42. In one embodiment, the tag database 42 is a database data structure in which each record is a "tag" that indexes an object in the content store 44, and contains relevant information about the stored object. An example of a tag record in the tag database 42 that indexes an object stored in the content store 44 is set forth in Table 1:

TABLE 1

| Field Name | Definition |
| --- | --- |
| MAC Address | Ethernet controller MAC address unique to each capture system |
| Source IP | Source Ethernet IP Address of object |
| Destination IP | Destination Ethernet IP Address of object |
| Source Port | Source TCP/IP Port number of object |
| Destination Port | Destination TCP/IP Port number of the object |
| Protocol | IP Protocol that carried the object |
| Instance | Canonical count identifying object within a protocol capable of carrying multiple data within a single TCP/IP connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Hash signature of object |
| Tag Signature | Hash signature of all preceding tag fields |

There are various other possible tag fields, and some embodiments can omit numerous tag fields listed in Table 1. In other embodiments, the tag database 42 need not be implemented as a database; other data structures can be used. The mapping of tags to objects can, in one embodiment, be obtained by using unique combinations of tag fields to construct an object's name. For example, one such possible combination is an ordered list of the Source IP, Destination IP, Source Port, Destination Port, Instance and Timestamp. Many other such combinations including both shorter and longer names are possible. In another embodiment, the tag can contain a pointer to the storage location where the indexed object is stored.

Referring again to FIG. 3, in one embodiment, the objects and tags stored in the object store module 32 can be interactively queried by a user via the user interface 34. In one embodiment the user interface can interact with a web server (not shown) to provide the user with Web-based access to the capture system 22. The objects in the content store module 32 can thus be searched for specific textual or graphical content using exact matches, patterns, keywords, and various other advanced attributes.

For example, the user interface 34 can provide a query-authoring tool (not shown) to enable users to create complex searches of the object store module 32. These search queries can be provided to a data mining engine (not shown) that parses the queries, scans the tag database 42, and retrieves the found object from the content store 44. Then, these objects that matched the specific search criteria in the user-authored query can be counted and displayed to the user by the user interface 34.

Searches can also be scheduled to occur at specific times or at regular intervals, that is, the user interface 34 can provide access to a scheduler (not shown) that can periodically execute specific queries. Reports containing the results of these searches can be made available to the user at a later time, mailed to the administrator electronically, or used to generate an alarm in the form of an e-mail message, page, syslog or other notification format.

In several embodiments, the capture system 22 has been described above as a stand-alone device. However, the capture system of the present invention can be implemented on any appliance capable of capturing and analyzing data from a network. For example, the capture system 22 described above could be implemented on one or more of the servers 14 or clients 16 shown in FIG. 1. The capture system 22 can interface with the network 10 in any number of ways, including wirelessly.

Figure 6:
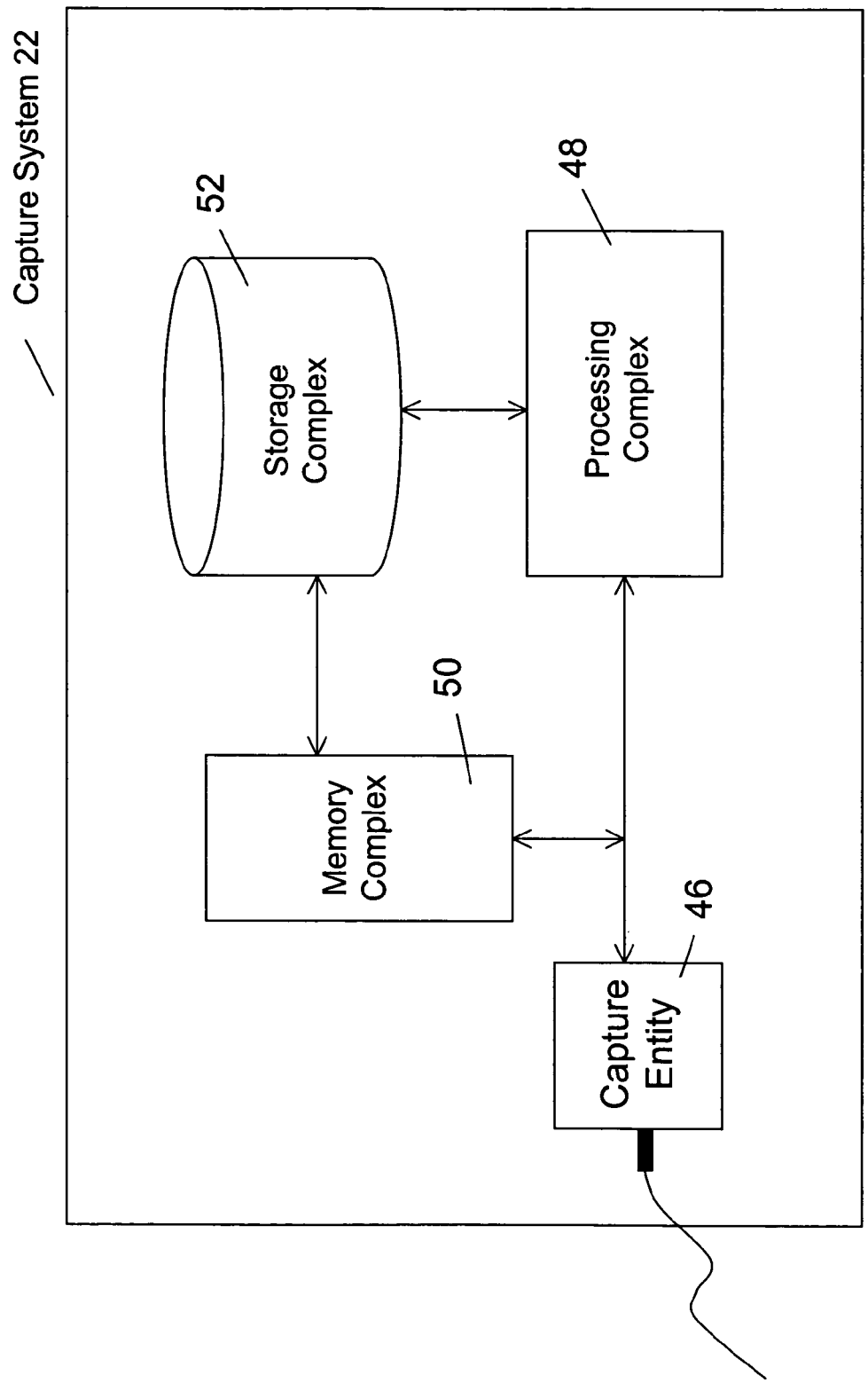
FIG. 6 is a block diagram illustrating an example hardware architecture for a capture system according to one embodiment of the present invention.

In one embodiment, the capture system 22 is an appliance constructed using commonly available computing equipment and storage systems capable of supporting the software requirements. In one embodiment, illustrated by FIG. 6, the hardware consists of a capture entity 46, a processing complex 48 made up of one or more processors, a memory complex 50 made up of one or more memory elements such as RAM and ROM, and storage complex 52, such as a set of one or more hard drives or other digital or analog storage means. In another embodiment, the storage complex 52 is external to the capture system 22, as explained above. In one embodiment, the memory complex stored software consisting of an operating system for the capture system device 22, a capture program, and classification program, a database, a filestore, an analysis engine and a graphical user interface.

Document Registration

The capture system 22 described above can also be used to implement a document registration scheme. In one embodiment, the a user can register a document with the system 22, which can then alert the user if all or part of the content in the registered document is leaving the network. Thus, one embodiment of the present invention aims to prevent unauthorized documents of various formats (e.g., Microsoft Word, Excel, PowerPoint, source code of any kind, text) from leaving an enterprise. There are great benefits to any enterprise that can keep its intellectual property, or other critical, confidential, or otherwise private and proprietary content from being mishandled.

Figure 7:
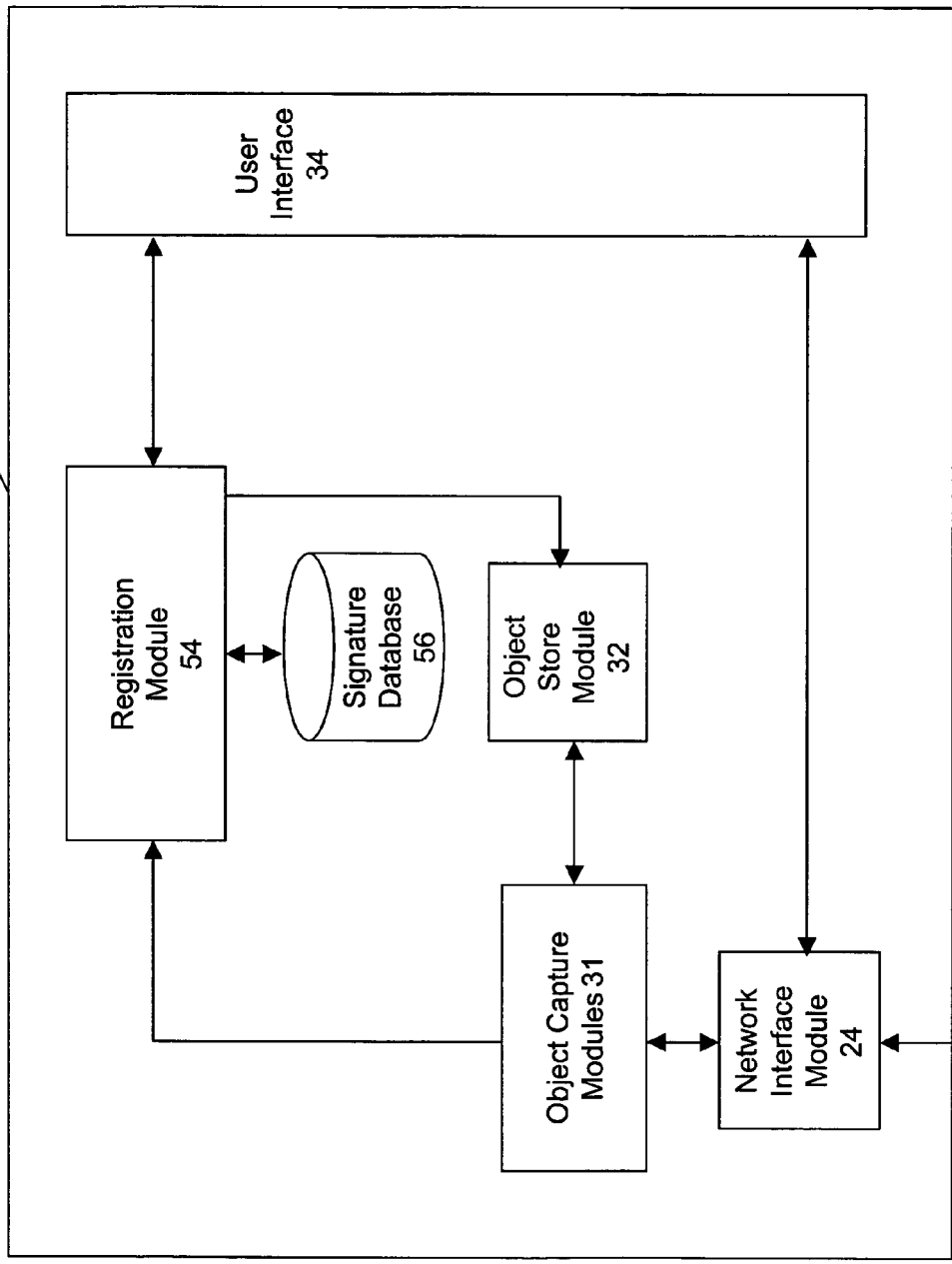
FIG. 7 is a block diagram illustrating a document registration system according to one embodiment of the present invention.

In one embodiment of the present invention, sensitive documents are registered with the capture system 22, although data registration can be implemented using a separate device in other embodiments. One embodiment of implementing registration capability in the capture system 22 is now described with reference to FIG. 7. For descriptive purposes, the capture system 22 is renamed the capture/registration system 22 in FIG. 7, and is also sometimes referred to as the registration system 22 in the description herein. The capture/registration system 22 has components similar or identical to the capture system 22 shown in FIG. 3, including the network interface module 24, the object store module 32, the user interface 34, and the packet capture 26, object assembly 28, and object classification 30 modules, which are grouped together as object capture modules 31 in FIG. 7.

In one embodiment, the capture/registration system 22 also includes a registration module 54 interacting with a signature database 56 to facilitate a registration scheme. In one embodiment, the user can register a document via the user interface 34. There are numerous ways to register documents. For example, a document can be electrically mailed (e-mailed), or uploaded to the registration system 22. The registration system 22 can also periodically scan a file server (registration server) for documents to be registered. The registration process can be integrated with the enterprise's document management systems. Document registration can also be automated and transparent based on registration rules, such as "register all documents," or "register all documents by specific author or IP address," and so on.

After being received, in one embodiment, a document to be registered is passed to the registration module 54. The registration module 54 calculates a signature of the document, or a set of signatures. The set of signatures associated with the document can be calculated in various ways. For example, the signatures can be made up of hashes over various portions of the document, such as selected or all pages, paragraphs, tables and sentences. Other possible signatures include, but are not limited to, hashes over embedded content, indices, headers or footers, formatting information or font utilization. The signatures can also include computations and meta-data other than hash digests, such as Word Relative Frequency Methods (RFM)—Statistical, Karp-Rabin Greedy-String-Tiling-Transposition, vector space models, and diagrammatic structure analysis.

The set of signatures is then stored in the signature database 56. The signature database 56 need not be implemented as a database; the signatures can be maintained using any appropriate data structure. In one embodiment, the signature database 56 is part of the storage complex 52 in FIG. 6.

In one embodiment, the registered document is also stored as an object in the object store module 32. In one embodiment, the document is only stored in the content store 44 with no associated tag, since many tag fields do not apply to registered documents. In one embodiment, one file of files 46 is a "Registered Documents" file.

In one embodiment, the document received from the user is now registered. As set forth above, in one embodiment, the object capture modules 31 continue to extract objects leaving the network, and store various objects based on capture rules. In one embodiment, all extracted objects—whether subject to a capture rule or not—are also passed to the registration module for a determination whether each object is, or includes part of, a registered document.

In one embodiment, the registration module 54 calculates the set of signatures of an object received from the object capture modules 31 in the same manner as of a document received from the user interface 34 to be registered. This set of signatures is then compared against all signatures in the signature database 56. In other embodiment, parts of the signature database can be excluded from this search to save time.

In one embodiment, an unauthorized transmission is detected if any one or more signatures in the set of signatures of an extracted object matches one or more signature in the signature database 56 associated with a registered document. Other detection tolerances can be configured for different embodiment, e.g., at least two signatures must match. Also, special rules can be implemented that make the transmission authorized, e.g., if the source address is authorized to transmit any documents off the network.

Figure 8:
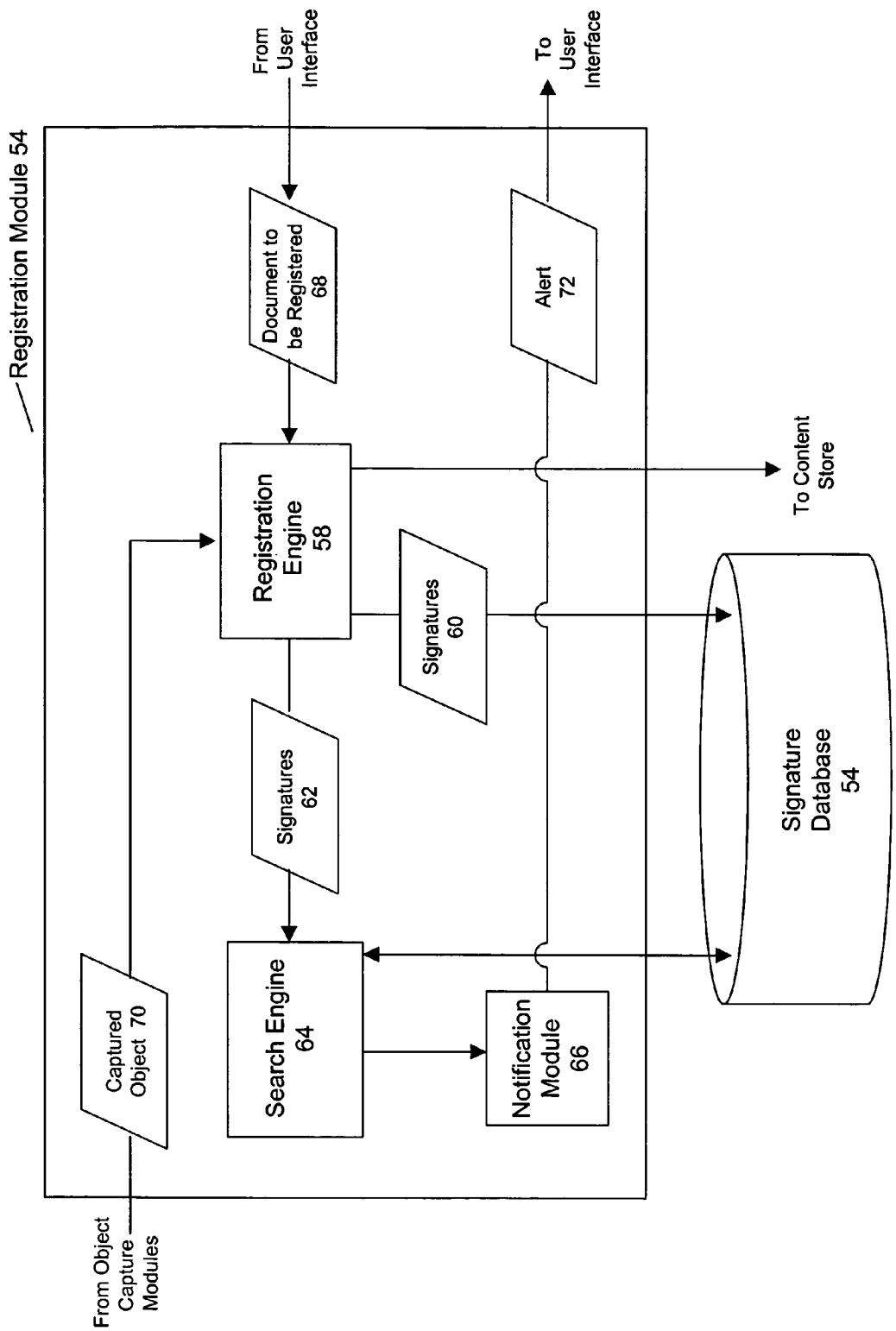
FIG. 8 is a block diagram illustrating registration module according to one embodiment of the present invention.

One embodiment of the registration module 54 is now described with reference to FIG. 8. As discussed above, a document to be registered 68 arrives via the user interface 34. The registration engine 58 generates signatures 60 for the document 68 and forwards the document 68 to the content store 44 and the signatures 60 to the signature database 54. The signatures 60 are associated with the document, e.g., by including a pointer to the document 68, or to some attribute from which the document 68 can be identified.

A captured object 70 arrives via the object capture modules 31. The registration engine calculates the signatures 62 of the captured object, and forwards them to the search engine 64. The search engine 64 queries the signature database 54 to compare the signatures 62 to the signatures stored in the signature database 54. Assuming for the purposes of illustration, that the captured object 70 is a Word document that contains a pasted paragraph from registered PowerPoint document 68, at least one signature of signatures 62 will match a signature of signatures 60. Such an event can be referred to as the detection of an unauthorized transfer, a registered content transfer, or other similarly descriptive terms.

In one embodiment, when a registered content transfer is detected, the transmission can be halted with or without warning to the sender. In one embodiment, in the event of a detected registered content transfer, the search engine 64 activates the notification module 66, which sends an alert 72 to the user via the user interface 34. In one embodiment, the notification module 66 sends different alerts—including different user options—based on the user preference associated with the registration, and the capabilities of the registration system 22.

In one embodiment, the alert 72 can simply indicate that the registered content, i.e., the captured object 70, has been transferred off the network. In addition, the alert 72 can provide information regarding the transfer, such as source IP, destination IP, any other information contained in the tag of the captured object, or some other derived information, such as the name of the person who transferred the document off the network. The alert 72 can be provided to one or more users via e-mail, instant message (IM), page, or any other notification method. In one embodiment, the alert 72 is only sent to the entity or user who requested registration of the document 68.

In another embodiment, the delivery of the captured object 70 is halted—the transfer is not completed—unless the user who registered the document 68 consents. In such an embodiment, the alert 72 can contain all information described above, and in addition, contain a selection mechanism, such as one or two buttons—to allow the user to indicate whether the transfer of the captured object 70 may be completed. If the user elects to allow the transfer, for example because he is aware that someone is emailing a part of a registered document 68 (e.g., a boss asking his secretary to send an email), the transfer is executed and the object 70 is allowed to leave the network.

If the user disallows the transfer, the captured object 70 is not allowed off the network, and delivery is permanently halted. In one embodiment, halting delivery can be accomplished by implementing an intercept technique by having the registration system 22 proxy the connection between the network and the outside. In other embodiments, delivery can be halted using a black hole technique—discarding the packets without notice if the transfer is disallowed—or a poison technique—inserting additional packets onto the network to cause the sender's connection to fail.

Figure 9:
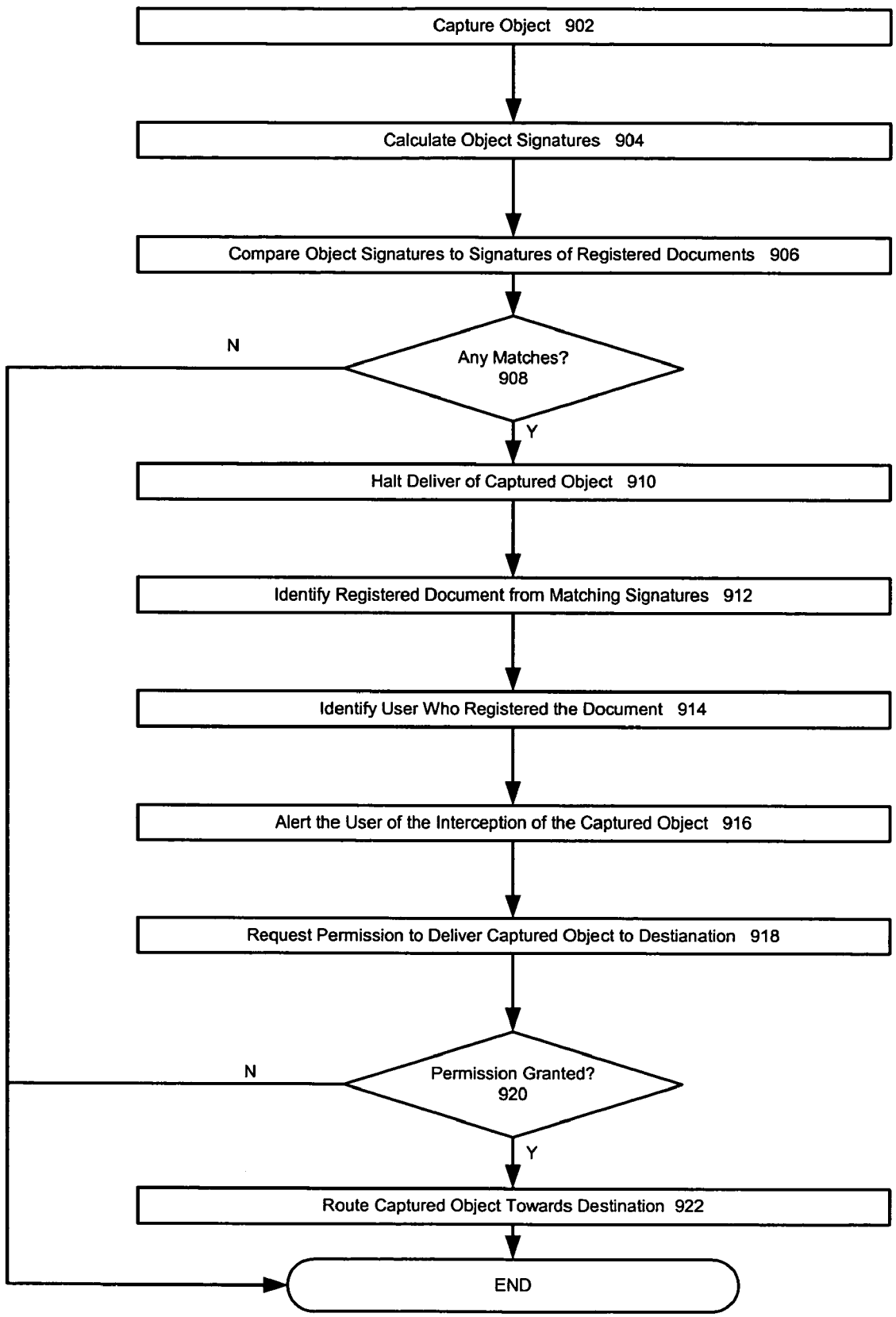
FIG. 9 is a flow diagram illustrating object capture processing according to one embodiment of the present invention.

FIG. 9 provides a flow chart to further illustrate object capture/intercept processing according to one embodiment of the present invention. All blocks of FIG. 9 have already been discussed herein. The example object capture processing shown in FIG. 9 assumes that various documents have already been registered with the registration system 22. The process shown in FIG. 9 can be repeated for all objects captured by the system 22.

Thus, a capture system and a document/content registration system have been described. In the forgoing description, various specific values were given names, such as "objects," and various specific modules, such as the "registration module" and "signature database" have been described. However, these names are merely to describe and illustrate various aspects of the present invention, and in no way limit the scope of the present invention. Furthermore, various modules, such as the search engine 64 and the notification module 66 in FIG. 8, can be implemented as software or hardware modules, or without dividing their functionalities into modules at all. The present invention is not limited to any modular architecture either in software or in hardware, whether described above or not.

What is claimed is:

1. A computer-implemented method comprising:
   maintaining a plurality of stored signatures in a data storage device, each signature being associated with one of a plurality of registered documents;
   intercepting packets being transmitted over a network between a source and a destination;
   reassembling the packets into an intercepted complete flow, wherein the intercepted complete flow represents an ordered data stream of a communication between the source and the destination;
   extracting a reassembled object from the intercepted complete flow to determine a content type of the reassembled object;
   calculating a set of signatures associated with the reassembled object; and
   comparing the set of signatures associated with the reassembled object with the plurality of stored signatures to determine if the reassembled object contains content associated with a registered document, wherein each registered document is associated with a user that requested registration of the document, the user being alerted if an attempt to transmit the registered document over a network is made.

2. The method of claim 1, further comprising, if the comparison results in a match of at least one of the signatures in the set of signatures with one or more of the plurality of stored signatures, then detecting registered content from the registered document being contained in the reassembled object.

3. The method of claim 2, further comprising halting delivery of the intercepted complete flow.

4. The method of claim 3, further comprising prompting the user that requested registration of the registered document for permission to deliver the intercepted complete flow, receiving permission from the user, and completing delivery of the intercepted complete flow in response to receiving permission.

5. The method of claim 1, wherein calculating the set of signatures of the reassembled object comprises calculating a plurality of hashes over one or more portions of the reassembled object.

6. The computer-implemented method of claim 1, wherein the intercepted complete flow includes a plurality of reassembled objects.

7. An apparatus comprising:
   a network interface module to connect the apparatus to a network;
   a signature database to store a first set of signatures, the first set of signatures being associated with a registered object, wherein the first set of signatures stored in the signature database is associated with a user who requested registration of the registered object;
   an object capture module to intercept packets being transmitted over the network between a source and a destination;
   an object assembly module to reassemble the packets into an intercepted complete flow, wherein the intercepted complete flow represents an ordered data stream of a communication between the source and the destination;
   an object classification module to extract a reassembled object from the intercepted complete flow to determine a content type of the reassembled object; and
   a registration module comprising a registration engine to generate a second set of signatures, the second set of signatures being associated with the reassembled object, and a search engine to compare the second set of signatures with the first set of signatures, the apparatus being configured to alert the user if an attempt to transmit the registered object over a network is made.

8. The apparatus of claim 7, wherein the registration module detects registered content from the registered object being transmitted over the network if the search engine matches one or more signatures in the second set of signatures with one or more signatures in the first set of signatures.

9. The apparatus of claim 8, wherein the registration module further comprises a notification module to generate an alert for the user who requested registration of the registered object in response to detecting registered content from the registered object being transmitted over the network.

10. The apparatus of claim 7, further comprising an object store module to store the reassembled object.

11. The apparatus of claim 10, wherein the registration module halts delivery of the intercepted complete flow from the object store module to the destination in response to detecting registered content from the registered object being transmitted over the network.

12. The apparatus of claim 11, wherein the registration module allows completion of the delivery of the intercepted complete flow from the object store module to the destination in response to receiving permission from the user who requested registration of the registered object.

13. The apparatus of claim 7, wherein the registration engine generates the second set of signatures by calculating a plurality of hashes over various portions of the reassembled object.

14. The apparatus of claim 7, wherein the intercepted complete flow includes a plurality of reassembled objects.

15. A non-transitory machine-readable medium storing a sequence of instructions that, when executed by a processor, cause the processor to perform operations comprising:

maintaining a plurality of stored signatures in a data storage device, each signature being associated with one of a plurality of registered documents, wherein each registered document is associated with a user that requested registration of the document;

intercepting packets being transmitted over a network between a source and a destination;

reassembling the packets into an intercepted complete flow, wherein the intercepted complete flow represents an ordered data stream of a communication between the source and the destination;

extracting a reassembled object from the intercepted complete flow to determine a content type of the reassembled object;

calculating a set of signatures associated with the reassembled object;

comparing the set of signatures associated with the reassembled object with the plurality of stored signatures to determine if the reassembled object contains content associated with a registered document; and alerting the user if an attempt to transmit the registered document over a network is made.

16. The non-transitory machine-readable medium of claim 15, wherein the instructions further cause the processor to detect registered content from the registered document being contained in the reassembled object, if the comparison results in a match of at least one of the signatures in the set of signatures with one or more of the plurality of stored signatures.

17. The non-transitory machine-readable medium of claim 16, wherein the instructions further cause the processor to halt delivery of the reassembled object.

18. The non-transitory machine-readable medium of claim 17, wherein the instructions further cause the processor to prompt the user that requested registration of the registered document for permission to deliver the reassembled object, and to deliver the intercepted complete flow if permission is given.

19. The non-transitory machine-readable medium of claim 15, wherein the intercepted complete flow includes a plurality of reassembled objects.

* * * * *

UNITED STATES PATENT AND TRADEMARK OFFICE
CERTIFICATE OF CORRECTION

PATENT NO.        : 7,814,327 B2                                                          Page 1 of 1
APPLICATION NO. : 10/815239
DATED             : October 12, 2010
INVENTOR(S)       : Ahuja et al.

It is certified that error appears in the above-identified patent and that said Letters Patent is hereby corrected as shown below:

At column 1, line 32, delete "," between the words, "information" and "leaks"

At column 3, delete lines 5 through 14, duplicate paragraph

"FIG. 1 illustrates a simple prior art configuration of a local area network (LAN) 10 connected to the Internet 12. Connected to the LAN 10 are various components, such as servers 14, clients 16, and switch 18. There are numerous other known networking components and computing devices that can be connected to the LAN 10. The LAN 10 can be implemented using various wireline or wireless technologies, such as Ethernet and 802.11b. The LAN 10 may be much more complex than the simplified diagram in FIG. 1, and may be connected to other LANs as well."

At column 3, line 54, after, "as a client 16.", insert

--In one embodiment, the capture system 22 intercepts all data leaving the network. In other embodiments, the capture system can also intercept all data being communicated inside the network 10. In one embodiment, the capture system 22 reconstructs the documents leaving the network 10, and stores them in a searchable fashion. The capture system 22 can then be used to search and sort through all documents that have left the network 10. There are many reasons such documents may be of interest, including network security reasons, intellectual property concerns, corporate governance regulations, and other corporate policy concerns.--

Signed and Sealed this

Sixteenth Day of November, 2010

David J. Kappos
*Director of the United States Patent and Trademark Office*